Figure 14:
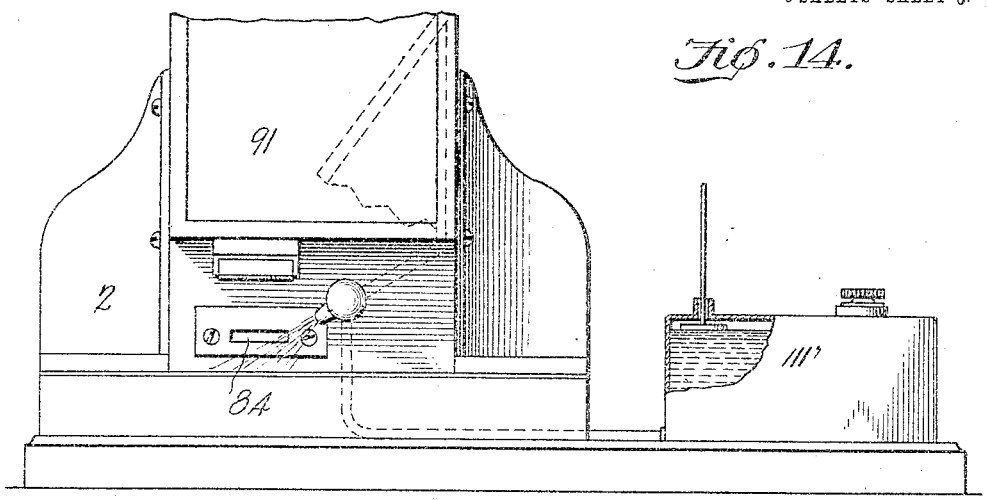

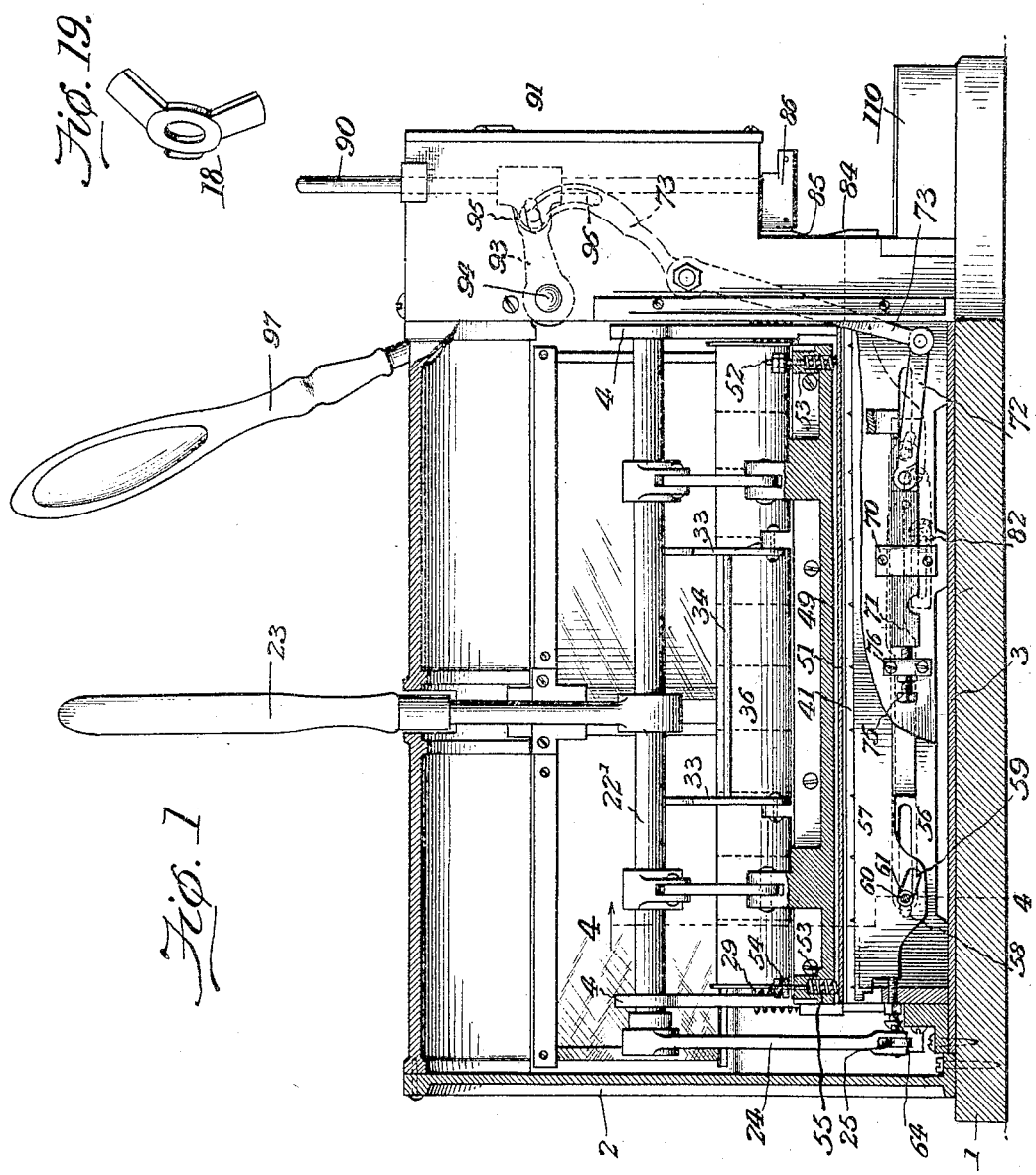

No. 778,744. PATENTED DEC. 27, 1904.
J. P. & S. FARMER.
STAMP AFFIXING MACHINE.
APPLICATION FILED JULY 24, 1903.
6 SHEETS—SHEET 2.
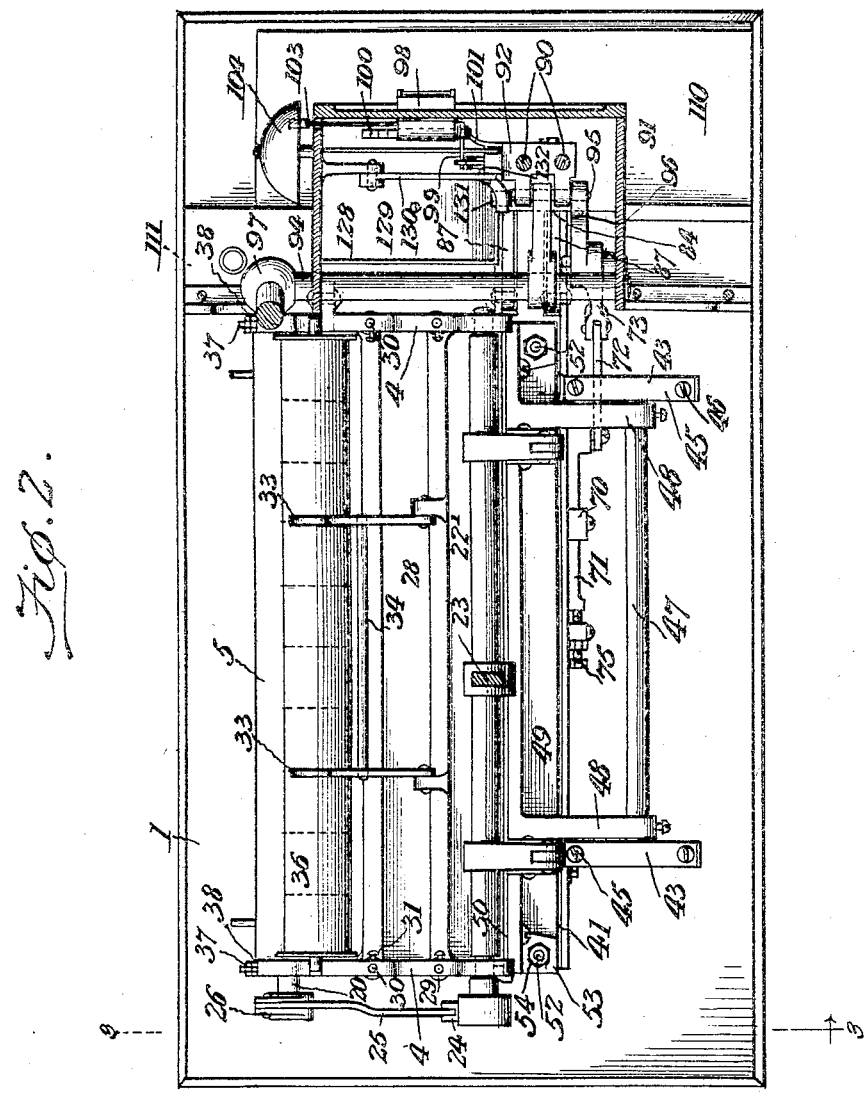

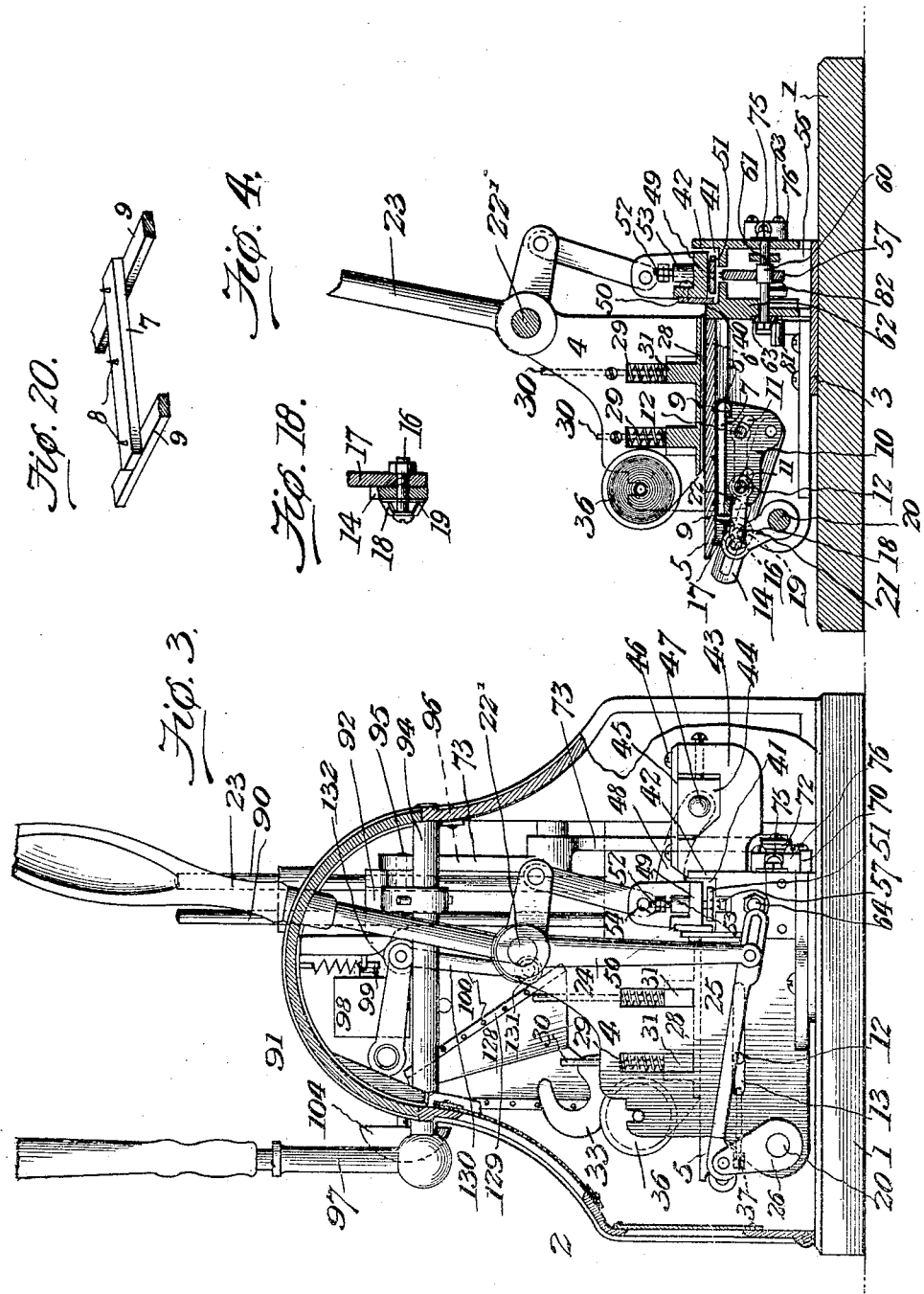

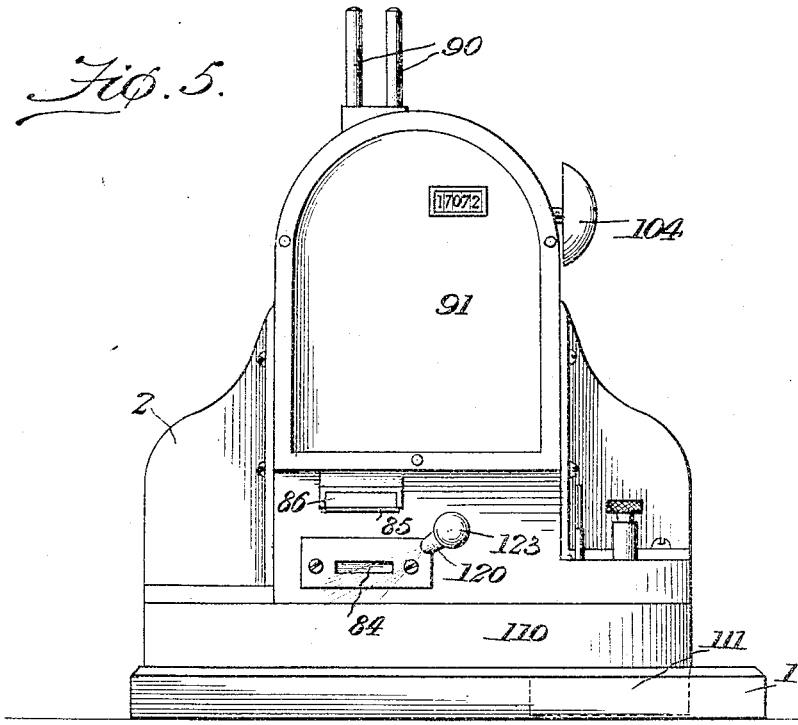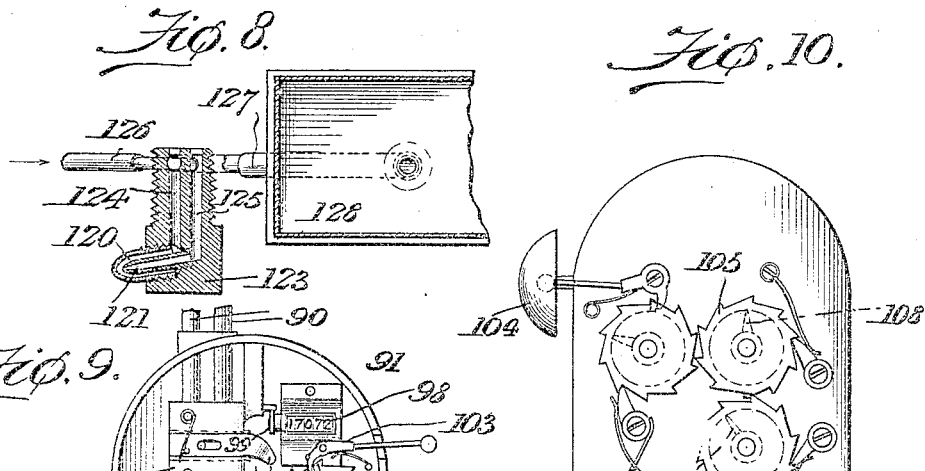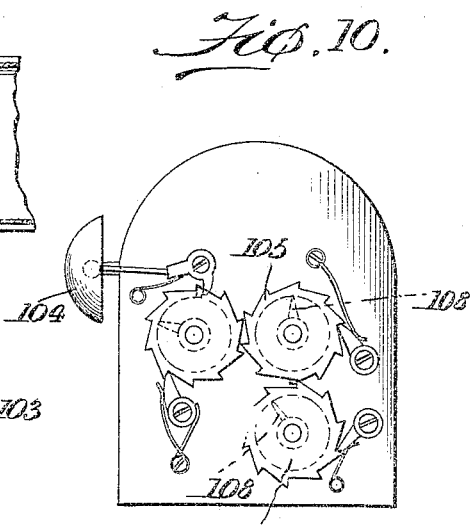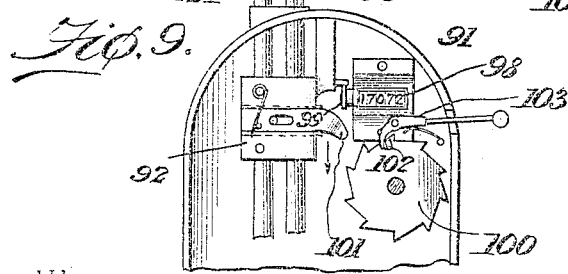

No. 778,744. PATENTED DEC. 27, 1904.
J. P. & S. FARMER.
STAMP AFFIXING MACHINE.
APPLICATION FILED JULY 24, 1903.
6 SHEETS—SHEET 5.
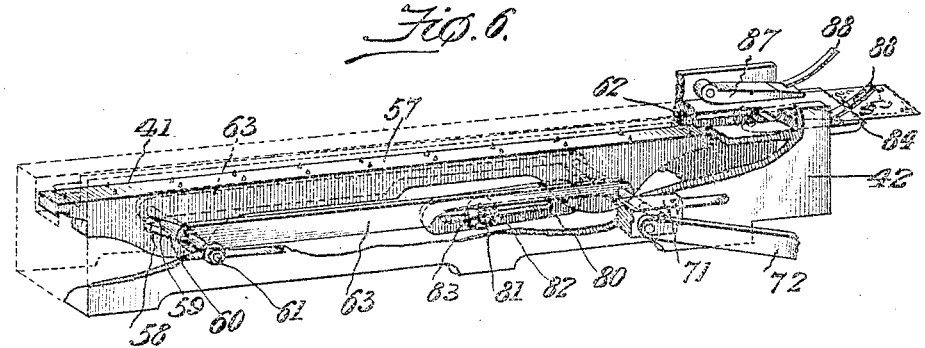
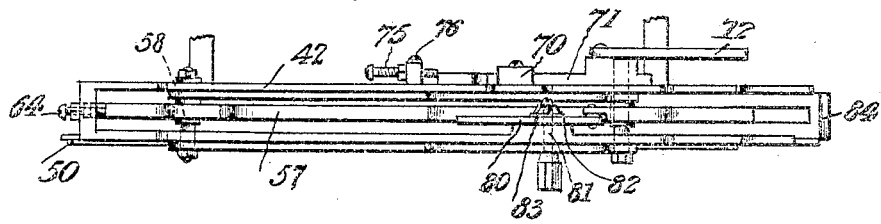
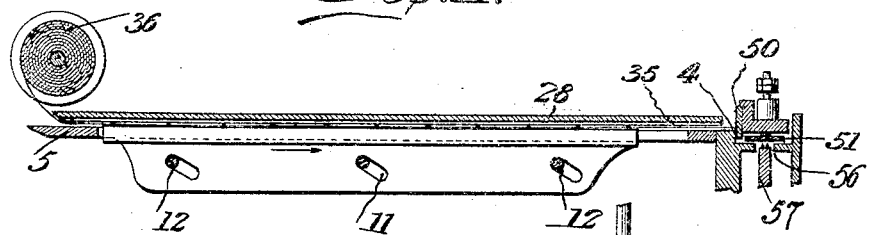
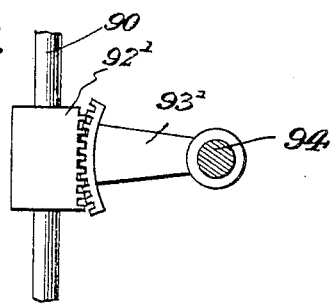
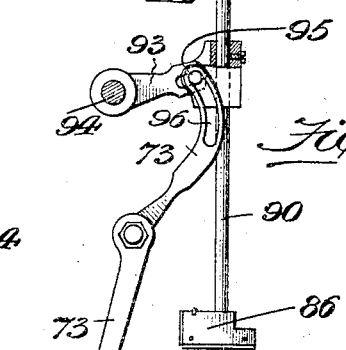
Witnesses
E. L. Stewart
Jno E Parker
John P. Farmer
Samuel Farmer, Inventors,
by C. A. Snow & Co
Attorneys No. 778,744. PATENTED DEC. 27, 1904.
J. P. & S. FARMER.
STAMP AFFIXING MACHINE.
APPLICATION FILED JULY 24, 1903.

6 SHEETS—SHEET 6.

Witnesses
E. F. Stewart
Jno. E. Parker

John P. Farmer and
Samuel Farmer, Inventors
by Cashow & Co.
Attorneys

No. 778,744. Patented December 27, 1904.

UNITED STATES PATENT OFFICE.

JOHN P. FARMER AND SAMUEL FARMER, OF PORTLAND, OREGON, ASSIGNORS TO A. F. FLEGEL, OF PORTLAND, OREGON.

STAMP-AFFIXING MACHINE.

SPECIFICATION forming part of Letters Patent No. 778,744, dated December 27, 1904.

Application filed July 24, 1903. Serial No. 166,867.

*To all whom it may concern:*

Be it known that we, JOHN P. FARMER and SAMUEL FARMER, citizens of the United States, residing at Portland, in the county of Multnomah and State of Oregon, have invented a new and useful Stamp-Affixing Machine, of which the following is a specification.

This invention relates to machines employed for affixing stamps to letters or mail-matter and the application of labels to packages and the like.

The principal object of the invention is to provide a device capable of receiving a large quantity of stamps in sheets and which will sever the sheets into single rows and then gradually feed consecutive single rows to a point where the single stamps are severed and applied to the letters without danger of collision between the remnants of a strip and a freshly-cut strip and in which the feed is of such nature as to insure proper movement of the row of stamps should the row be broken.

A further object of the invention is to provide a stamp-feeding means that will engage the perforations of an entire row of stamps at each movement.

A still further object of the invention is to provide an improved tension and friction device for engaging and holding the stamps during the feeding operation and to provide means for adjusting the same.

A still further object of the invention is to provide an improved means for feeding a sheet of stamps toward a cutting-knife by which successive rows of stamps are severed from the sheet.

A still further object of the invention is to provide a novel form of atomizer for moistening the envelops and other articles to which the stamps or labels are to be applied and in this case to provide means for actuating the atomizer at a proper period during the stamp-feeding movement.

A still further object of the invention is to provide a novel form of registering device for counting the number of stamps delivered from the machine and for severing the single rows from the sheet of stamps.

With these and other objects in view, as will hereinafter more fully appear, the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 15:
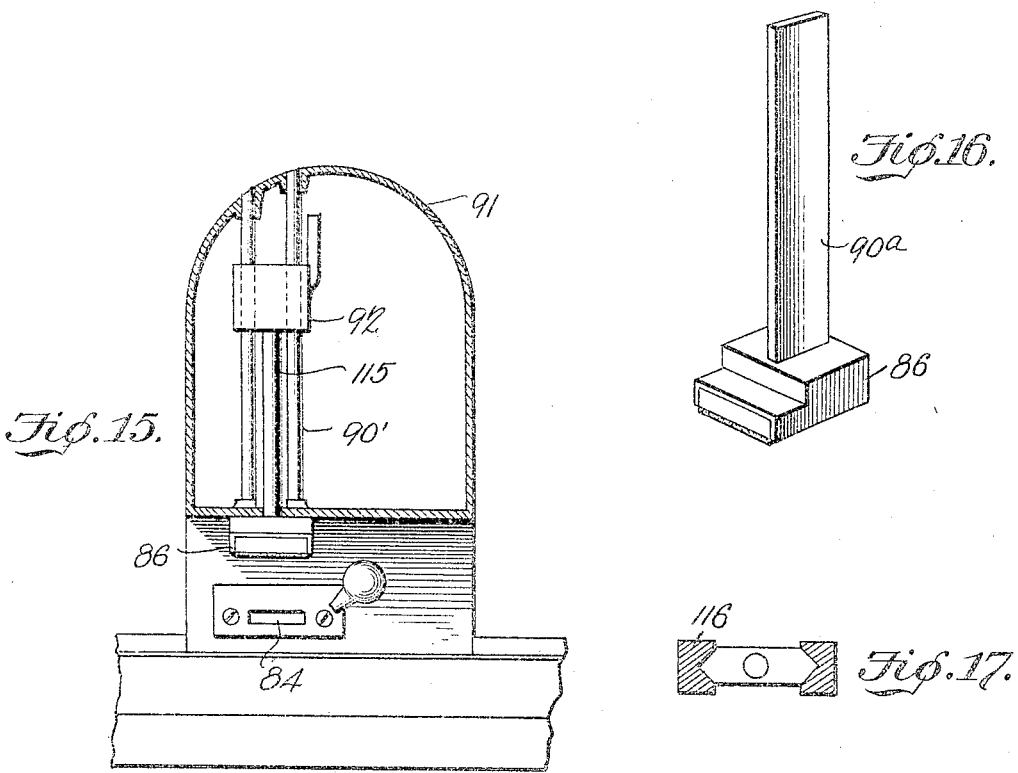
Figure 16:
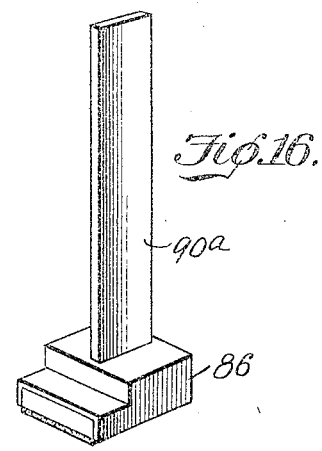
Figure 17:

In the accompanying drawings, Figure 1 is a longitudinal sectional elevation of a stamp-affixing machine constructed in accordance with the invention. Fig. 2 is a plan view of the machine, a portion of the casing being removed and the remaining portion illustrated in section. Fig. 3 is a transverse sectional elevation of the machine on the line 3 3 of Fig. 2. Fig. 4 is a similar view on the line 4 4 of Fig. 1. Fig. 5 is a front elevation of the machine. Fig. 6 is a detail perspective view of the mechanism for feeding single rows of stamps in the direction of a severing-knife. Fig. 7 is an inverted plan view of the mechanism shown in Fig. 6. Fig. 8 is a detail sectional view, drawn to an enlarged scale, illustrating the construction of the atomizer. Fig. 9 is an elevation of the front end of the machine, a portion of the front casing being removed in order to illustrate the arrangement of the registering mechanism. Fig. 10 is a view of a portion of a registering and alarm mechanism which may be employed in place of that shown in Fig. 9. Fig. 11 illustrates a modification of the mechanism for feeding the sheets of stamps. Fig. 12 illustrates a slight modification in the construction of the mechanism for operating the presser-block and knife. Fig. 13 is a detail view of a portion of the mechanism now employed at the head or front end of the machine. Fig. 14 is an elevation of the front end of the machine, illustrating a slight modification in the position of the water-containing reservoir. Fig. 15 is a transverse sectional elevation through the head of the machine, showing a modified construction of guide. Fig. 16 illustrates a still further modification of the presser-block-guiding means. Fig. 17 is a sectional plan view showing a still further modification of the guide. Fig. 18 is an enlarged detail view of one of the frictional retarding devices employed for preventing abrupt movement of the stamp-feeders. Fig. 19 is a detail view of one of the springs for preventing abrupt movement of the stamp-feeding devices. Fig. 20 is a detail view of a portion of the sheet-feeding mechanism detached, illustrating one of the strips provided with three sets of teeth.

Similar numerals of reference are employed to indicate corresponding parts throughout the several figures of drawings.

The working parts of the machine are mounted on a suitable base 1 and inclosed in a casing 2, of which a portion is movable in order that access may be had to the interior for the purpose of renewing the supply of stamps or for any adjustment of the machine which may be necessary.

The general frame of the machine comprises a base-plate 3, having a pair of standards or end frames 4, the standards forming a support for a bed or table 5, on which the sheet of stamps is supported and across which the sheet is fed to be severed into single rows. The bed-plate may be of any length desired, and the sheet-feeding means may engage between the perforations of one or more rows of stamps, it being designed in some cases to provide eleven or more sets of teeth for engagement with a corresponding number of rows of stamps in order to insure continuity of feed of a number of separated sheets. This mechanism, however, will to some extent depend on the character of the articles on which the machine is operating and for ordinary postage-stamps may be small and compact, or the size of the parts may be increased to any extent in order that large labels may be applied to packages of any character, or the mechanism may be used on the application of address-slips to newspaper-wrappers or similar purposes. In the bed or table 5 are arranged a number of transversely-disposed slots 6, through which project feeders 7, these in the present case being in the form of strips provided with projecting teeth 8, which engage in the perforations between successive rows of stamps. The several strips 7 are secured to a pair of parallel bars 9, arranged under the table, and at the ends of the bars are plates 10, each plate being provided with a pair of inclined slots 11, through which extend bars 12, and the ends of said bars fit within the horizontally-disposed guiding-slots 13, arranged in the end frames 4 and serving to prevent any movement of said bars save in a horizontal plane, and as a result of this reciprocatory movement imparted to the bars the strips 7 will be raised and lowered as said bars travel in the inclined slots 11. As a means of limiting movement of the members 10 each is provided with a pivoted strip 14, having an elongated slot through which extends a pin 16, carried by a stud 17. By preference the pin is in the form of an adjustable bolt and carries a spring 18, which may exert greater or less pressure on a friction-washer 19, and thus act to prevent any abrupt movement of the arms 14 and stamp-feeding members. This spring may be of the construction shown in Fig. 19 and is preferably in the form of a dished disk, having a number of arms for engagement with the washer.

Mounted in suitable bearings in the opposite end frames 4 is a rock-shaft 20, carrying rocker-arms 21, from which extend links 22 to the actuating-bars 12, and when movement is imparted to the rock-shaft the rods are reciprocated, moving until they traverse the inclined slots 11 and in so doing either raise or lower the stamp-engaging strips 7. This feeding movement is accomplished by means of a rock-shaft 22', having an actuating-handle 23 extending out through a suitable slot in the casing and within convenient reach of the operator. At one end of the rock-shaft 22' is a lever 24, connected by a slotted link 25 to a rocker arm 26 on rock-shaft 20, and at each operation of the lever 23 the stamps are fed forward to an extent sufficient to project a single row of stamps into position under a severing-knife. This portion of the mechanism, as previously described, may be of any desired size, and in the drawings two forms of mechanism are shown, in one of which the feeding-strips are provided each with three sets of teeth, and in the other the feeding-strips are provided with eleven sets of teeth in order to engage with two successive sheets of stamps. When the longer strips are used, it is preferred to add to the number of bars 12, three being used in the present instance.

To prevent abrupt feeding movement of the sheet of stamps, I employ a friction-plate 28, which bears on the upper surface of the stamp-sheet and is held thereagainst by means of suitable springs 29, surrounding the guide-rods 30. The guide-rods are arranged in suitable openings in the end frames 4 and extend also through openings formed in end lugs 31, projecting from the friction-plate. It is preferred to employ two or more springs at each end of the plate in order that the pressure may be equalized, and in some instances three or more springs may be used and each provided with an independent mechanism for adjusting the strain which it exerts on the friction-plate. The friction-plate is provided with a pair of hooks 33, so pivoted as to permit their engagement with the rock-shaft 22' when it is desired to raise and hold the friction-plate elevated during the introduction of a fresh supply of stamps. For convenience the pair of hooks is connected by a cross-bar 34, forming a handle by means of which the friction-plate may by raised. The under surface of the friction-plate is provided with a plurality of parallel grooves 35 to receive the stamp-feeding teeth 8. This portion of the mechanism is operated at intervals in order to sever successive rows of stamps from a sheet. In practice a number of sheets are secured together in any suitable manner and wound on a roller 36, adapted to suitable bearings in the opposite end frames. The feeding movement may be limited by one or more adjustable screws 37, having lock-nuts 38, the ends of the screws projecting into the rod-guiding slots 13 and serving to limit the movement of said rods.

At the rear edge of the table is arranged a cutting-blade 40, forming one wall of a stamp receiving and guiding trough 41, the opposite wall of which is formed by a vertically-disposed plate 42. From the plate 42 projects two brackets 43, having recesses to receive bearing-blocks 44, these blocks being held in place by strips 45 and being engaged by screws 46 to facilitate adjustment of said blocks. The blocks serve as supports for a rod 47, carrying arms 48, and said arms are secured to or formed integral with a bar 49, carrying a cutter 50, adapted to coöperate with the cutting-blade 40 during the severing of a row of stamps. The bar 49 serves as a support for a friction-strip 51, from which projects pins 52, the upper ends of said pins projecting through openings in lugs 53, carried by bar 49 and being threaded for the reception of nuts 54, and surrounding these pins are compression-springs 55, which bear against the tension-strip 51 and force the latter into engagement with the row of stamps contained in the trough 41, the tension or frictional strain which the strip exerts being adjusted by turning the nuts 54. In the bottom of the trough 41 is a slot 56, extending practically for the full length of the trough and serving to permit the passage of a row-feeding strip 57, which is provided, preferably, with eleven sets of teeth for engaging perforations between the stamps of the row. In machines of this class of ordinary construction it has been found necessary to positively engage and positively feed the row for its entire length. When only one or two of the stamps are engaged, a frictional retarding means, in resisting the feeding movement of the stamps, will cause the stamps to separate from each other at the lines of perforation, the feed becoming irregular and resulting in waste of stamps.

The strip 57 is provided with pendent lugs 58, in which are formed inclined slots 59. These slots receive rollers 60, carried by pins 61, the opposite ends of which are adapted to suitable guiding-slots disposed in parallel relation in the plate 42 and a mating plate 62. The two pins 61 are connected in pairs by strips 63, which lie flat against the plates 42 and 62, respectively, in order to insure uniform and regular movement of the feeding-strip, and the movement of said strip is limited by means of a screw 64, adapted to a suitable threaded opening at one end of the trough and provided with a locking-nut for holding the screw in any desired position of adjustment. Secured to the plate 42 is a block 70, provided with a guiding-opening for the reception of a slide 71, and in one end of the slide is an opening for the reception of one of the pins 61. The slide 71 is connected by a link 72 to one end of a lever 73, and as said lever is operated movement is transmitted to the feeding-strip, and the teeth are first moved upward into engagement with the perforations between the stamps and afterward the strip is moved forward toward the discharge end of the trough in order to project a single stamp therefrom. The limiting movement of the feeding-strips may also be accomplished by proper adjustment of a screw 75, extending through a block 76 at one side of the plate 42 and adapted to be engaged by the end of the slide 71.

To prevent abrupt movement of the feeding-strip, we employ a slotted link 80, pivotally connected to one of the depending lugs of the feeding-strip, and extending through the slot in said link is a bolt 81, carrying a spring-washer 82, having a number of arms or fingers and preferably of the construction illustrated in Fig. 19. The bolt also carries a friction-washer 83, the end of the bolt being arranged in convenient position at a point outside the plate 42 in order to permit of any adjustment necessary in the proper operation of the feeding-strip.

At the discharge end of the trough is a cutting-knife 84, which coöperates with a movable cutting-knife 85, mounted on a pressing-block 86 and operated in suitable manner to press the block and to sever the stamp from the row to force said stamp into contact with a previously-moistened surface. At the end of the trough the friction-strip is narrowed somewhat, Fig. 2, in order to permit of the contact of a pair of pivoted arms 87 with the opposite edges of the row of stamps, and these arms serve to positively hold the last portion of a row in proper position and prevent interference with a subsequent row fed to the trough. In the majority of machines of this class considerable difficulty is found in handling the last portion of a row of stamps and preventing collision of the end of a fresh row therewith, this being partly due to the difference in friction exerted on a single stamp and a complete row of stamps and in part by the tendency of a feeding means to move a single stamp from proper position. This is overcome by the employment of the pivoted arms 87, which fall by gravity into engagement with the stamps, or springs 88 may be employed in order to increase the frictional resistance to the movement of said stamps. It will be observed on reference to Fig. 2 that the friction-strip is contracted in width at the point where the stamps are discharged from the machine in order that the pawls 87 may engage with the edge portions of the rows of stamps when the friction-strip is elevated by its carrier in order to permit the cutting of a fresh row of stamps from the sheet.

The presser-block 86, previously referred to, is carried by a pair of rods 90, that extend through suitable upper and lower guides in the head portion 91 of the casing, and to these rods is secured a block 92, having a pin-and-slot connection with a rocker-arm 93, carried by a rock-shaft 94, or, as shown in Fig. 12, the shaft may be provided with a pinion 93' and engage a rack 92' on the block. This block carries a projecting pin 95, fitting within a curved cam-slot 96 in the slide-actuating lever 73, said lever being pivoted at an approximately central point and so arranged as to insure accuracy of feeding movement. The rock-shaft 94 extends out through the frame and at one end is provided with an operating-handle 97, which may be moved to and fro at any desired speed in order to force successive stamps into contact with the letters or other articles to which they are to be attached.

To keep account of the number of stamps used, there is employed a registering device 98, having an additional lever 99, that is operated on each movement of the block 92 and imparts movement to the initial disk or dial of the register, there being suitable transferring mechanism of any desired character between the successive disks or dials in order to keep an accurate account of the stamps.

As stamps are universally in rows of ten, it is desirable that the operator be informed when a row is exhausted, and there will be necessity for severing an additional row from the sheet. For this purpose I employ a ratchet-wheel 100, engaged by a small spring-pressed pawl 101, carried by the block 92, the ratchet-wheel carrying a pin 102, so disposed that at each tenth operation, or each complete rotation of the ratchet-wheel, it will engage a spring-held arm 103, said arm extending out through a suitable opening in the head portion of the casing and carrying a clapper for engaging a gong or other alarm 104. This notifies the operator of the necessity of severing the rows of stamps from the sheet.

The registering mechanism may be to some extent modified by providing the ratchet-wheel with a pin for engagement with the teeth of the ratchet-wheel 105, and said ratchet-wheel 105 may be provided with a pin 106 for engagement with the teeth of the ratchet-wheel 107, these ratchet-wheels having shafts or spindles extending out through suitable openings in the casing and provided with an arrow or pointer 108, traveling over suitable dials. This constitutes a simple form of transferring mechanism, and where each wheel is provided with ten teeth the number of stamps used will be properly indicated on the dial at the head of the machine.

Below the presser-block 86 is arranged a bed or table 110, on which the envelops or other articles are placed to permit the proper application of the stamps or labels thereto. Below this table is a water-reservoir 111, from which water is withdrawn and sprayed on the envelop or other article for the purpose of moistening the same prior to the pressing of the stamp into engagement therewith.

In mechanism of this class the employment of the ordinary spraying device will cause the accumulation of more or less moisture within the machine and in some cases ruining the stamps. It will naturally result in some irregularity in the feed, and therefore it is desirable to keep the machine as dry as possible. In order to properly spray the water, there is employed an atomizer, including an air-nozzle 120 and a water-nozzle 121, disposed one within the other and so arranged that the passage of a current of air past the discharge end of the water-nozzle will induce the flow of water outward from the supply-tank to the nozzle 121, the mingled jet of air and water being discharged through a suitable opening at the end of the nozzle 120 and directed to the surface to be moistened. The two nozzles are held by the block 123, threaded at one end and fitting within the threaded opening at the end of the casing. This block has two passages 124 and 125, communicating one with the water-nozzle and the other with the air-nozzle. The passage 124 is connected, preferably by a metallic tube 126, to the water-tank, and the passage 125 is connected by a tube 127 to a bellows 128, arranged within the casing at the head of the machine. The movable member of the bellows is in the form of a plate 129, with which engages an arm 130, carrying a suitable antifriction-roller 131. The arm 130 is pivoted within the head of the machine and has a roller 132 engaged by the side of the movable block 92, so that at each operation of the handle the bellows will be actuated and the volume of air directed to the nozzle 120, the air carrying with it a sufficient quantity of water to effect the desired moistening operation. The water-reservoir may be placed at one side of the machine, as indicated at 111' in Fig. 14, where it will be convenient for refilling and cleansing.

Instead of mounting the presser-block 86 on movable bars or rods 90 these bars may be rigid, as indicated at 90' in Fig. 15, and the movable operating-block 92 may be secured to the presser-block by means of a connecting-bar 115. This construction may be further modified by employing a wide flat bar 90ᵃ, as shown in Fig. 16, in place of the two rods 90, or the slide may be guided between two recessed bars 116, as shown in Fig. 17.

Having thus described the invention, what is claimed is—

1. In a stamp-affixing machine, a feeding means comprising a strip having a plurality of sets of pins for engaging the perforations between the stamps, a yieldable friction-plate having grooves for the reception of the pointed ends of the pins, means for reciprocating the strip, and mechanism forming a part of the reciprocating means for moving the pins toward and from the stamps at the starting and finishing of the feeding operation.

2. In a stamp-affixing machine, a toothed feeding-strip, a strip-carrier having a plurality of inclined grooves, a pair of parallel bars, pins carried by the bars and extending through said inclined grooves, guides extending parallel with the plane of the strip and serving to receive the end portions of said pins, and means for reciprocating said bars.

3. In a stamp-affixing machine, a toothed feeding-strip, a strip-carrier having a plurality of inclined slots, a pair of horizontally-guided bars, pins carried by said bars and extending through said slots, means for reciprocating the bars, and a friction means for retarding the movement of said bars, substantially as specified.

4. In a stamp-affixing machine, a feeding device, a reciprocating means therefor, a pair of members including a slotted link and a bolt extending therethrough, one of said members being stationary, and a spring-pressed washer carried by the bolt and serving to engage said slotted link, thereby to retard the movement of the feeding-strip, substantially as specified.

5. In a stamp-affixing machine, a toothed feeding-strip, means for operating the strip, a slotted link having a pivotal connection with the strip, an adjustable bolt having one end extending through the slot, a washer carried by the bolt and engaging the link, and a spring member carried by the bolt and having a plurality of spaced arms in engagement with the washer.

6. In a stamp-affixing machine, a toothed feeding-strip, a strip-carrier having a plurality of inclined slots, pins extending through said slots, antifriction-collars on said pins for engagement with the walls of the slot, a pair of bars disposed one on each side of the strip and connecting the pins, a supporting means having horizontally-disposed slots to receive and guide said pins, means for reciprocating the bars, and means for retarding the movement of said bars, substantially as specified.

7. In a stamp-affixing machine, a supporting-surface for the strip of stamps, means for feeding successive rows of stamps onto said supporting-surface, a feeding-strip of a length greater than the length of an ordinary row of stamps, and provided with a number of sets of stamp-engaging pins greater than the number of stamps in a single row so that after a row has been partially fed a second row may be engaged and moved with the remainder of the first row, and means for manipulating said strip.

8. In a stamp-affixing machine, the combination with stamp-feeding means, of dogs or pawls pivoted to a stationary portion of the frame and adapted to engage the surface of the stamps and to hold the same in position between feeding intervals, and a friction-plate serving to engage the upper surface of the stamps and having a contracted portion extending between the dogs or pawls.

9. In a stamp-affixing machine, a row-severing knife, a carrier therefor, a toothed feeding-strip, a yieldable clamping-strip supported by the carrier and having grooves to receive the teeth of the feeding-strip, and adjustable springs bearing on said friction-strip.

10. In a stamp-affixing machine, a friction-strip, a carrier movable to disengage the friction-strip from a row of stamps, and auxiliary holding devices disconnected from the carrier and strip and serving to hold the row of stamps when the strip is removed.

In testimony that we claim the foregoing as our own we have hereto affixed our signatures in the presence of two witnesses.

JOHN P. FARMER.
SAMUEL FARMER.

Witnesses:
A. F. FLEGEL,
IVA M. HODGES.